Patented Oct. 31, 1933

1,932,562

UNITED STATES PATENT OFFICE 1,932,562

AGE RESISTING VULCANIZED RUBBER PRODUCT AND PROCESS OF MANUFACTURING SAME

Robert L. Sibley, Nitro, W. Va., assignor to The Rubber Service Laboratories Company, Akron, Ohio, a corporation of Ohio No Drawing. Application November 19, 1930
Serial No. 496,818

16 Claims. (Cl. 18—50)

The present invention relates to a process for the manufacture of vulcanized rubber and the products obtained thereby. More particularly the invention is directed to an improved process of manufacturing vulcanized rubber and the like wherein there is incorporated into a rubber mix of vulcanization characteristics, a compound of the type hereinafter disclosed whereby anti-oxidant or age resisting properties are developed in the vulcanized rubber product. The invention will be understood from the following description and examples wherein a preferred mode of operating the invention is fully set forth and described.

It is well known that rubber deteriorates rapidly when exposed to air, heat and sunlight and that such deterioration is characterized by a loss in the tensile strength, resiliency and other desirable properties of the material. It has now been found according to the present invention that such deterioration can be very greatly lessened if there be incorporated in the rubber mix a compound of the class hereinafter set forth.

The age resisting characteristics of a vulcanized rubber product can be readily ascertained by subjecting samples of the vulcanized product to an accelerated aging test wherein portions of the cured rubber product are subjected in a bomb to the action of oxygen under pressure and maintained for several hours at an elevated temperature. The treated samples are then examined and tested and the results so obtained compared with similar results obtained by testing the unaged vulcanized stock. The deterioration in properties suffered as a result of from 18 to 39 hours of the oxidation treatment at approximately 300 pounds pressure is indicative of the result that would normally be expected from that particular stock during about two years of natural aging. Such a test is known as the Bierer-Davis aging test.

The new class of anti-oxidant or age resisting materials which have been found upon incorporation into a rubber stock to impart such excellent age resisting qualities to the vulcanized product that portions thereof, when subjected to the artificial aging tests described, undergo only a relatively small loss in tensile strength and other qualities, comprise a reaction product of a dioxydinaphthylmethane and an aryl amine containing more than six carbon atoms.

One method whereby one of the preferred class of anti-oxidants, for example, the reaction product of beta-beta-dioxydinaphthylmethane and para-toluidine, may be prepared is as follows:

Beta-beta-dioxydinaphthylmethane and para-toluidine in the ratio of substantially one molecular proportion of the former compound to an excess over two molecular proportions of the latter compound were placed in a suitable container and heated, preferably in the presence of para-toluidine hydrochloride, at a temperature of approximately 170 to 200° C. with agitation for substantially four hours. After cooling to approximately 30° C., the excess of unreacted para-toluidine was removed by making the solution alkaline and distilling, or, if convenient or desirable, by washing with a dilute acid, for example, hydrochloric acid, and then washing the product with water. The product prepared as described was compounded in the well known manner in a typical rubber tread stock comprising:

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenylguanidine | 1 |
| Anti-oxidant described above | 1 |

The stock thus formed was then vulcanized by heating sheets of the said stock in a press in the well known manner for different periods of time at the temperautre given by 40 pounds of steam pressure per square inch. Portions of the stock cured in the manner as described were then artificially aged by heating in an oxygen bomb in the manner described for 39 hours at a temperature of 70° C. and an oxygen pressure of 300 pounds per square inch. A comparison between the tensile and modulus properties of the aged and unaged vulcanized rubber product so obtained is given in Table I.

Table I

| Cure mins. | Hours aged | Modulus of elasticity in lbs/in² at elongations of | | Tensile at break in lbs/in² | Ultimate elongation percent |
|---|---|---|---|---|---|
| | | 300% | 500% | | |
| 30 | 0 | 842 | 2190 | 3820 | 685 |
| 30 | 39 | 836 | 2015 | 2725 | 590 |
| 60 | 0 | 1288 | 3075 | 4460 | 640 |
| 60 | 39 | 1293 | 2625 | 3030 | 560 |
| 90 | 0 | 1530 | 3415 | 4760 | 630 |
| 90 | 39 | 1378 | 2790 | 2945 | 525 |

The data set forth in Table I show that the preferred class of anti-oxidant materials, for example, the reaction product of beta-beta-dioxydinaphhylmethane and para-toluidine, possesses particularly desirable anti-oxidant properties.

Another example of the preferred class of anti-oxidants was prepared by reacting substantially one molecular proportion of beta-beta-dioxydinaphthylmethane with an excess over two molecular proportions of beta-naphthylamine, preferably in the presence of beta-naphthylamine hydrochloride, in a manner analogous to that described above. The product thus prepared was compounded in a rubber tread stock comprising:

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenylguanidine | 1 |
| Anti-oxidant described above | 1 |

The stock was then vulcanized by heating for different periods of time at the temperaure given by 40 pounds of steam pressure per square inch. Portions of the stock thus cured were artificially aged by heating in an oxygen bomb in the manner hereinbefore described for 39 hours at a temperature of 70° C. and under an oxygen pressure of 300 pounds per square inch. A comparison between the tensile and modulus properties of the aged and unaged vulcanized rubber product is given in Table II.

*Table II*

| Cure mins. | Hours aged | Modulus of elasticity in lbs/in² at elongations of | | Tensile at break in lbs/in² | Ultimate elongation percent |
|---|---|---|---|---|---|
| | | 300% | 500% | | |
| 30 | 0 | 883 | 2225 | 3575 | 665 |
| 30 | 39 | 870 | 2020 | 2650 | 600 |
| 60 | 0 | 1268 | 3100 | 4375 | 640 |
| 60 | 39 | 1308 | 2575 | 2920 | 550 |
| 90 | 0 | 1498 | 3460 | 4510 | 610 |
| 90 | 39 | 1480 | 2780 | 2915 | 510 |

From the data set forth in Table II it is apparent that the reaction product of beta-beta-dioxydinaphthylmethane and beta-naphthylamine possesses the desirable anti-oxidant properties of the preferred class of compounds.

As further examples of operating the present invention, a reaction product of beta-beta-dioxydinaphthylmethane and 2,4-diamido diphenylamine, a reaction product of alpha-alpha-dioxydinaphthylmethane and p,p'-diamidodiphenylmethane, and a reaction product of beta-beta-dioxydinaphthylmethane and alpha-naphthylamine have been prepared and incorporated in rubber stocks of similar composition to those described above and the said stocks cured and aged in the manner set forth. The results of the aging tests showed that these compounds also possess anti-oxidant properties characteristic of the preferred class of new compounds.

In like manner, a dioxydinaphthylmethane may be reacted with various other aromatic amines, thus forming further examples of the preferred class of anti-oxidants. Thus, alpha-alpha-dioxydinaphthylmethane or beta-beta-dioxydinaphthylmethane may be reacted with ortho-toluidine, xylidine, diphenylamine, paraphenylene diamine, meta-phenylene diamine, and similar aryl mono or diamine compounds, and the products thus formed employed as anti-oxidants in the manner described.

In the examples hereinbefore set forth, diphenylguanidine was employed as the accelerator, because it is known that a vulcanized rubber stock wherein it is used possesses poor aging qualities. In fact, a tread stock of the composition employed in the examples set forth above cured in the presence of diphenylguanidine as an accelerator, but containing no anti-oxidant, melts down to a shapeless mass incapable of test when subjected to the aging test described. Other accelerators could of course, have been employed, resulting in different tensile and modulus figures than those hereinbefore set forth, but still exhibiting the desirable anti-oxidant properties of the preferred class of compounds.

From the data hereinbefore set forth it is apparent that the preferred class of compounds comprises an important class of anti-oxidants which have been employed advantageously in a rubber stock.

The present invention is limited solely by the claims attached hereto as a part of the present specification as a part of the present specification, wherein it is intended to claim the invention as broadly as possible in view of the prior art.

What is claimed is:

1. The process of vulcanizing rubber which comprises heating rubber and sulfur in the presence of an anti-oxidant comprising a reaction product of a dioxydinaphthylmethane and one member of a group consisting of a phenylamine and a naphthylamine, said amine containing more than six but less than fourteen carbon atoms.

2. The process of vulcanizing rubber which comprises heating rubber and sulfur in the presence of an anti-oxidant comprising a reaction product of a dioxydinaphthylmethane and one member of a group consisting of a phenyl primary amine and a naphthyl primary amine, said amine containing more than six and less than fourteen carbon atoms.

3. The process of vulcanizing rubber which comprises heating rubber and sulfur in the presence of an anti-oxidant comprising a reaction product of beta-beta-dioxydinaphthylmethane and paratoluidine.

4. The process of vulcanizing rubber which comprises heating rubber and sulfur in the presence of an anti-oxidant comprising a reaction product of substantially one molecular proportion of beta-beta-dioxy-dinaphthylmethane and substantially two molecular proportions of para-toluidine.

5. The vulcanized rubber product prepared by heating rubber and sulfur in the presence of an anti-oxidant comprising a reaction product of a dioxydinaphthylmethane and one member of a group consisting of a phenylamine and a naphthylamine, said amine containing more than six but less than fourteen carbon atoms.

6. The vulcanized rubber product prepared by heating rubber and sulfur in the presence of an anti-oxidant comprising a reaction product of a dioxydinaphthylmethane and one member of a group consisting of a phenyl primary amine and a naphthyl primary amine, said amine containing more than six and less than fourteen carbon atoms.

7. The vulcanized rubber product prepared by heating rubber and sulfur in the presence of an anti-oxidant comprising a reaction product of beta-betadioxydinaphthylmethane and para-toluidine.

8. The vulcanized rubber product prepared by heating rubber and sulfur in the presence of an anti-oxidant comprising a reaction product of substantially one molecular proportion of betabeta-dioxydinaphthylmethane and substantially two molecular proportions of para-toluidine.

9. The process of vulcanizing rubber which comprises heating rubber and sulfur in the presence of an anti-oxidant comprising a reaction product of a dioxydinaphthylmethane and a toluidine.

10. The vulcanized rubber product prepared by heating rubber and sulfur in the presence of an anti-oxidant comprising a reaction product of a dioxydinaphthylmethane and a toluidine.

11. The process of vulcanizing rubber which comprises heating rubber and sulfur in the presence of an anti-oxidant comprising a reaction product of beta-beta-dioxydinaphthylmethane and a toluidine.

12. The vulcanized rubber product prepared by heating rubber and sulfur in the presence of an anti-oxidant comprising a reaction product of beta-beta-dioxydinaphthylmethane and a toluidine.

13. The process of vulcanizing rubber which comprises heating rubber and sulfur in the presence of an anti-oxidant comprising a reaction product of a dioxydinaphthylmethane and one member of a group consisting of para-toluidine, ortho-toluidine, xylidene, alpha-naphthylamine, beta-naphthylamine, diphenylamine, para-phenylene diamine, meta-phenylene diamine, 2,4 diamino diphenyl amine and p,p' diamino diphenylmethane.

14. The vulcanized rubber product prepared by heating rubber and sulfur in the presence of an anti-oxidant comprising a reaction product of a dioxydinaphthylmethane and one member of a group consisting of para-toluidine, ortho-toluidine xylidene, alpha-naphthylamine, beta-naphthylamine, diphenylamine, para-phenylene diamine, meta-phenylene diamine, 2,4 diamino diphenylamine and p,p' diamino diphenylmethane.

15. The process of vulcanizing rubber which comprises heating rubber and sulfur in the presence of an anti-oxidant comprising a reaction product of a dioxydinaphthylmethane and an aromatic hydrocarbon containing one or more amino substituents only, said aromatic hydrocarbon containing more than six and less than fourteen carbon atoms.

16. The vulcanized rubber product produced by heating rubber and sulfur in the presence of an anti-oxidant comprising a reaction product of a dioxydinaphthylmethane and an aromatic hydrocarbon containing one or more amino substituents only, said aromatic hydrocarbon containing more than six and less than fourteen carbon atoms.

ROBERT L. SIBLEY